(12) United States Patent
Thoms et al.

(10) Patent No.: US 7,140,385 B2
(45) Date of Patent: Nov. 28, 2006

(54) VALVE ARRANGEMENT FOR CONTROLLING HYDRAULIC FLUID IN AN AXIAL PISTON MACHINE

(75) Inventors: Reinhardt Thoms, Neumunster (DE); Carsten Fiebing, Jevenstedt (DE)

(73) Assignee: Sauer-Danfoss Inc., Ames, IA (US)

( * ) Notice: Subject to any disclaimer, the term of this patent is extended or adjusted under 35 U.S.C. 154(b) by 277 days.

(21) Appl. No.: 10/929,203

(22) Filed: Aug. 30, 2004

(65) Prior Publication Data
US 2005/0056317 A1    Mar. 17, 2005

(30) Foreign Application Priority Data
Sep. 15, 2003   (DE) .............................. 103 42 478

(51) Int. Cl.
*F16K 17/18* (2006.01)
(52) U.S. Cl. ............................... 137/493.6; 137/599.18
(58) Field of Classification Search ............ 137/493.6, 137/493.1, 599.18
See application file for complete search history.

(56) References Cited

U.S. PATENT DOCUMENTS

| | | | | |
|---|---|---|---|---|
| 3,060,965 A | * | 10/1962 | Taggart ................. | 137/599.18 |
| 3,112,763 A | * | 12/1963 | Tennis et al. ............ | 137/493.6 |
| 4,217,927 A | * | 8/1980 | Morita ..................... | 137/493.3 |
| 4,270,567 A | * | 6/1981 | Tsukimoto ............... | 137/493.5 |
| 5,095,939 A | * | 3/1992 | Alderfer et al. .......... | 137/512.1 |

FOREIGN PATENT DOCUMENTS

DE    102 39 725 A1    8/2002

* cited by examiner

*Primary Examiner*—Stephen M. Hepperle (57) ABSTRACT

In the stationary part (1) of an axial piston machine, a first flow duct (2) and second flow duct (5) intersect with the central axes (3) and (6). A valve body (20) having a valve cone (21) and a tubular guide piston which can be displaced in relation to the valve cone is situated in the extension of the central axis (3) of the first flow duct (2). The valve body (21) bears against a first valve seat (4) which is surrounded by an expanded section (7). The entire valve body (20) moves in a tubular partial housing (9) which is connected to the stationary part (1) in a sealed manner via a seal (11), a screw connection (10) and a flange (12) which rests on a shoulder (13) of the stationary part (1). A first compression spring (27) and a second compression spring (28) serve to support the valve body (20) and its parts in relation to one another. An extension stem (22) passes through the tubular guide piston and guides the second compression spring (28). The tubular partial housing (9) sits in a bore (8) of the stationary part (1). Two valves V1 and V2 are formed, the valves setting flow paths between the first flow duct (2) and the second flow duct (5) which differ according to pressure ratios.

14 Claims, 5 Drawing Sheets

VALVE ARRANGEMENT FOR CONTROLLING HYDRAULIC FLUID IN AN AXIAL PISTON MACHINE

BACKGROUND OF THE INVENTION

The invention relates to a valve arrangement for controlling hydraulic fluid in an axial piston machine in which a first flow duct is provided in a stationary part and opens out into a second flow duct running transversely, an accommodating space of the stationary part being formed lying opposite the second flow duct in the extension of the first flow duct and being intended for accommodating and guiding a multiple valve body, which can be displaced in the direction of the central axis of the flow duct and in which the multiple valve body comprises a first and a second valve body which are arranged one behind the other in the direction of the longitudinal axis of the first flow duct and can be displaced in relation to each other in this direction.

A valve arrangement of this type has frequently been fitted in various axial piston machines. The valve PLC 182 on page 6–9–3 of publication HY17-8702/UK of February 2001 by Parker Mobile Hydraulics is one such example. In this case, the first flow duct is connected to a hydraulic fluid store which is under low pressure, i.e. it serves as a feed-in line. The second flow duct of the known valve arrangement serves as a connecting line to a high-pressure working line, and can therefore be under high pressure or low pressure depending on the operating conditions. The two valve bodies, together with associated valve seats form a first and a second valve, one serving as a feed valve and enabling hydraulic fluid which is under low pressure to flow from the first flow duct into the second flow duct. By contrast, the other valve serves as a pressure-limiting valve and enables hydraulic fluid to flow from the connecting line into the feed line if the working pressure in the high-pressure working line has become impermissibly high.

The known valve arrangement is therefore a directly controlled, preset high-pressure limiting valve with a feed-in function. In terms of structure, it is designed in such a manner that the first valve body is inserted into the second valve body where it has its valve seat, while the second valve body interacts with a seat formed in the stationary part. Two valves are therefore fitted one inside the other, the two valve seats being spaced apart only a little distance from each other in the direction of the central axis of the first flow duct. In this known valve arrangement, the through flow cross section is therefore restricted for structural reasons. This is true with a pressure-limiting valve because the valve serving for this purpose has to be arranged within the cross section of the valve body that implements the feed-in function.

However, it is precisely for the pressure-limiting function that a rapid response is imperative, for which purpose relatively large flow cross sections are desired. In order to satisfy this demand, the known valve arrangement would have to be designed with very large cross sections. However, this is not possible when it is fitted into axial piston machines.

Pilot-controlled valves are therefore generally used in cases of this type. One example of this is illustrated and described in DE 102 39 725 A1. According to this, a hydraulic pressure-limiting valve has a first flow duct and a second flow duct running transversely with respect to it. This pressure-limiting valve permits hydraulic fluid to pass from the first flow duct into the second flow duct if the pressure of the hydraulic fluid in the first flow duct exceeds a certain threshold value. For this purpose, a first valve body is arranged in the region between the two flow ducts. The first valve body is bored through, so that the first flow duct is connected continuously to the space behind the first valve body. A second valve is arranged behind the first valve body, coaxially with it, and serves as a pilot valve. If the pressure of the hydraulic fluid in the first flow duct exceeds a threshold value, the pilot valve opens. In conjunction with a correctly dimensioned restoring spring, the effect achieved by the dropping pressure on the rear side of the first valve body is that the opening and closing forces for the first valve body are reduced. However, the larger a valve is, the more expensive it is to produce and to use. Pilot-controlled valves are always more expensive than directly controlled valves. In addition, they have to be designed such that they can be adjusted because they cannot be preset with sufficient accuracy.

It is therefore a primary object of the present invention to provide a valve arrangement of the type mentioned, which permits large throughflows with a low pressure loss, takes up little installation space and can be produced cost-effectively.

These and other objects will be apparent to those skilled in the art.

BRIEF SUMMARY OF THE INVENTION

A valve arrangement is provided for controlling hydraulic fluid in an axial piston machine in which a first flow duct (2) is provided in a stationary part (1) and opens out into a second flow duct (5) running transversely with respect to it, having the following features:

a) an accommodating space (14) of the stationary part (1) is formed, lying opposite the second flow duct (5), in the extension of the first flow duct (2) and is intended for accommodating and guiding a multiple valve body (20), which can be displaced in the direction of the central axis (3) of the first flow duct (2);

b) the multiple valve body comprises a first, and a second valve body which are arranged one behind the other in the direction of the longitudinal axis of the first flow duct (2) and can be displaced in relation to each other in this direction;

c) the first valve body facing the first flow duct (2) interacts, in order to form a first valve (V1), with a first valve seat (4) which is formed in the region in which the first flow duct (2) opens out into the second flow duct (5);

d) the second valve body interacts, in order to form a second valve (V2), with a second valve seat (29) which is formed in the first valve body and is situated in the region of the second flow duct (5), the hydraulic cross section $F_2$ of the second valve seat (29) being larger than the hydraulic cross section $F_3$ of the first valve seat (4) and the two valve bodies being prestressed against their valve seats (4, 29) by compression springs (27, 28);

e) the accommodating space (14) of the stationary part (1) is connected to the first flow duct (2) via the two valve bodies, but is sealed off from the second flow duct (5);

f) the hydraulically effective cross sections $F_2$ and $F_3$ of the first and second valve seat (4, 29) are dimensioned in such a manner and the two compression springs (27, 28) are coordinated in such a manner that f1) the first valve (vi) opens when the 30 hydraulic fluid in the second flow duct (5) has a pressure $P_5$ which is larger than the pressure $P_2$ in the first flow duct (2) and the threshold value is exceeded, or f2) the second valve (V2) opens when the hydraulic fluid in the first flow duct (2) has a pressure $P_2$ which is greater than the pressure $P_5$ in the second flow duct (5) and a threshold value is exceeded, while f3) in the inoperative position the two valves (V1, V2) are closed.

In the case of the valve arrangement according to the invention, the second valve seat, which is formed between the two valve bodies, is situated in the region of the second flow duct, as a result of which its hydraulic cross section can be considerably larger than the valve seat of the first valve, which seat is formed in the region in which the first flow duct opens out into the second flow duct, and therefore on the stationary part. The two valve seats move apart to a certain extent and are controlled in mutual dependence via their diameter and area ratios. In contrast to the prior art, there are not two individual valves fitted one inside the other, in the case of the valve arrangement according to the invention, but rather a valve system having an overall control, it being of particular importance that the accommodating space of the stationary part is connected to the first flow duct via the two valve bodies, but sealed off from the second flow duct. The threshold value for the two valves is determined by the two compression springs.

The valve arrangement according to the invention therefore permits large through flows with a low pressure loss, is a very compact construction and nevertheless manages with few individual parts, and so it can be produced economically.

The valve arrangement according to the invention is advantageously provided in an axial piston machine having a hydraulic control, in which the first flow duct serves as a connecting line to a high-pressure working line and the second flow duct serves as a connecting line to a source for hydraulic fluid which is under high pressure, the first valve being operated as a feed valve and the second valve being operated as a pressure-limiting valve.

In this arrangement, a large transition cross section from the first flow duct into the second flow duct is available particularly for the pressure-limiting function in the working line, i.e. the "high-pressure function".

Claims 3 to 5 therefore contain structural details, such as three different hydraulic cross sections $F_1$, $F_2$ and $F_3$ which determine the control of the valve arrangement. A decisive factor in every case is that the hydraulic fluid present in the first flow duct passes into the accommodating space of the stationary part where it fills all of the cross sections and, by differently pressurizing the tubular guide piston and the valve cone, depending on the operating state, triggers a different opening function.

The guiding of the first and of the second valve cones on each other is the subject matter of Claims 6 to 8. For easy assembly, the valve cone and its extension stem 22 namely have to be produced separately and put together only after the second compression spring is fitted. The connection takes place on the hollow guide stem 25 which is formed on the valve cone. In this case, the extension stem is introduced into the guide stem and, in principle, can be connected in different ways, such as a press fit, soldering, welding or bonding. However, the screw connection which is specified by claim 7 is preferred because it opens up the possibility of also setting the spring prestress simultaneously with the connection. In this case, a different depth of penetration of the fastening thread is possible, but similarly also the interposition of spacer discs.

The design and accommodation of the compression springs specified in Claims 8 to 12 results in the already mentioned, particularly compact construction of the valve arrangement according to the invention.

The arrangement of a special, tubular partial housing according to Claim 12 facilitates the assembly and permits relatively great structural freedom in designing the accommodating space for accommodating and guiding the second valve body.

Claims 13 and 14 show one structural possibility of how the first flow duct can be brought permanently into connection with the accommodating space of the stationary part, in which case interior spaces in the tubular guide piston also have to be filled with the hydraulic fluid originating from the first flow duct. However, the flow passage claimed by Claim 14 is in no way the sole possibility for this. It is also possible for the play between the outer circumferences of the valve cone, its guide stem and the pressure and guide plate in relation to the surrounding inner walls of the tubular guide piston to bring about this connection in a specific manner if the sealing cone is open on its end surface facing the first flow duct and therefore permits hydraulic fluid to reach the outer circumferences mentioned.

DESCRIPTION OF THE PREFERRED
EMBODIMENT OF THE INVENTION

Figure 1:
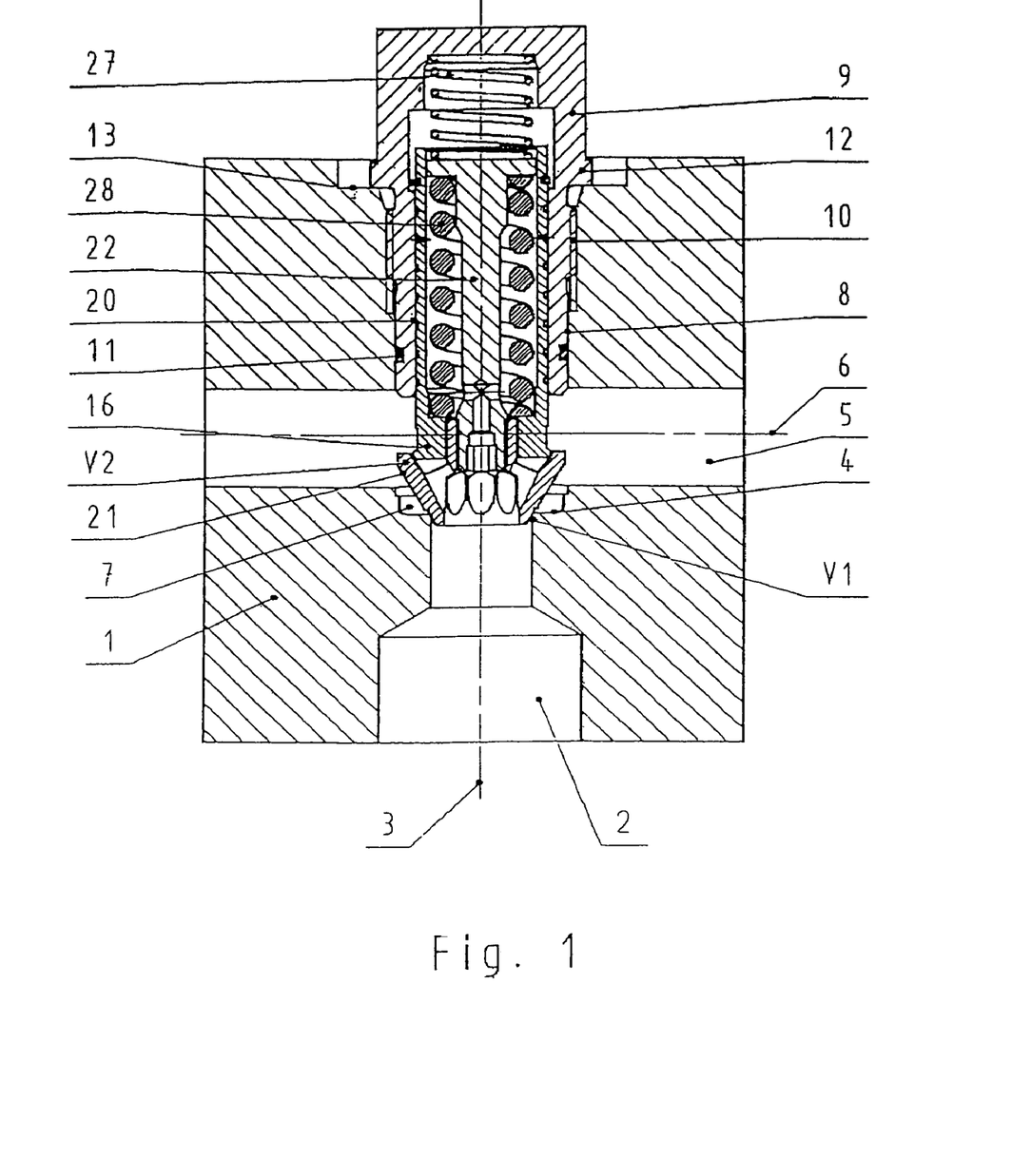
FIG. 1 shows a longitudinal section through the valve arrangement according to the invention, with the two valves being in the closed state.

FIG. 1 schematically illustrates a stationary part which is situated on an axial piston machine. It may also be fitted in the interior of the axial piston machine. A first flow duct 2, the central axis of which is designated by 3, opens out into the stationary part 1. A second flow duct 5 having the central axis 6 runs transversely thereto. The first flow duct 2 opens out into the second flow duct 5. At the point at which the first flow duct 2 opens out into the second flow duct 5, a first valve seat 4 is formed in the stationary part 1. In this case, the first flow duct 2 is provided at its opening-out end with an expanded section 7 which surrounds the valve cone 21, which is to be described later. As a consequence of this expansion, there is essentially only linear contact between the valve cone 21 and the valve seat 4.

In the extension of the first valve duct 2, a bore 8 having the same central axis 3 as the first flow duct 2 is situated in the stationary part 1. A tubular partial housing 9 is inserted in a pressure tight manner into this bore. The partial housing 9 is connected to the stationary part 1 via a screw connection 10, sealed by a flange 12 on a recessed shoulder 13 of the stationary part 1 and sealed at its end protruding into the second flow duct 5 by additional seals 11. The tubular partial housing 9 is closed on its outside.

The bore of the tubular partial housing 9 forms an accommodating space 14 and a cylindrical guide for a tubular guide piston 15. The latter forms part of a multiple valve body 20, which comprises a first and a second valve body. The first valve body is a valve cone 21, while the tubular guide piston 15 is the second valve body. At its end facing the first flow duct 2, the guide piston 15 has an end wall 16 of relatively solid design, while its remaining region 15a, i.e. most of its length, is designed as a cylindrical tube. The end wall 16 inwardly forms an inner shoulder 17 and is provided with a bore 18. Annular grooves 19 ensure that although the tubular guide piston 15 can slide in the bore 14 of the tubular partial housing 9, a passage of hydraulic fluid from the second flow duct 5 into the interior of the partial housing 9 is prevented.

The valve cone 21 is arranged in a longitudinally displaceable manner on the tubular guide piston 15. Particular importance is attached to the shape of the valve cone 21. FIG. 1 clearly shows that the valve cone 21 is basically annular in the form of a conical annular casing 21a, the conical annular casing expanding in the direction of the transition from the first flow duct 2 into the second flow duct 5. By means of its outer contour, which is at the bottom in FIG. 1, the valve cone 21 interacts with the first valve seat 4. In the interior, the valve cone 21 is, however, broken through and is provided with a ribbed structure 23 and openings 24.

At its end facing away from the first valve seat 4, the valve cone 21 is provided with a hollow guide stem 25. The connection of the hollow guide stem 25 to the conical annular casing 21a takes place via the ribbed structure 23. The hollow guide stem 25 engages in the bore 18 of the end wall 16 which is formed on the tubular guide piston 15. As a result, the valve cone 21 and the tubular guide piston 15 can be displaced longitudinally in relation to each other.

An extension stem 22 engages in the interior of the hollow guide stem 25 and is connected at this point releasably and adjustably by means of a thread to the valve cone 21. At that end of the extension stem 22 which faces away from the valve cone 21, a pressure and guide plate 26 is formed. The latter has three functional surfaces, namely an outer surface 26a, an inner, annular surface 26b facing the valve cone 21, and a circular cylindrical circumferential surface 26c. The outer surface 26a is acted upon by a first compression spring 27, which is supported at its opposite end on the closing-off, outer end wall of the tubular partial housing 9.

The inner annular surface 26b forms a stop and active surface for a second compression spring 28. The second compression spring 28 acts at its opposite end on the inner shoulder 17 (already mentioned) of the tubular guide piston 15. The two compression springs 27 and 28 are designed as helical springs.

It is now clear that the prestress of the two compression springs 27, 28 can be influenced by the screw connection between the extension stem 22 and the hollow guide stem 25. It is also possible in this case for spacer discs to be pushed onto the extension stem, for example before it is screwed together with the valve cone 21.

In the assembled state, there remains an annular cylindrical inner space 15b, in which the second compression spring 28 is situated, between the inner wall of the tubular guide piston 15 and the extension stem 22. In the assembled state, the first compression spring 27 is furthermore prestressed and presses the valve body 20, and therefore also the valve cone 21, against the first valve seat 4. As a result, the valve seat 4 and valve cone 21 form a first valve V1.

A second valve V2 is formed by the valve cone 21 at its larger end facing away from the first valve seat 4, itself being designed as a valve seat 29. This is the second valve seat of the arrangement. It interacts with the end wall 16 (already mentioned) of the tubular guide piston 15. For this purpose, the end wall 16, at its outer end facing the valve cone 21, has the shape of a collar 30 of slightly enlarged diameter. It has to be ascertained that the second valve seat 29 is situated centrally in the cross section of the second flow duct 5. The collar 30 can therefore be acted upon on both of its sides by the pressures prevailing in the flow ducts.

Figure 2:
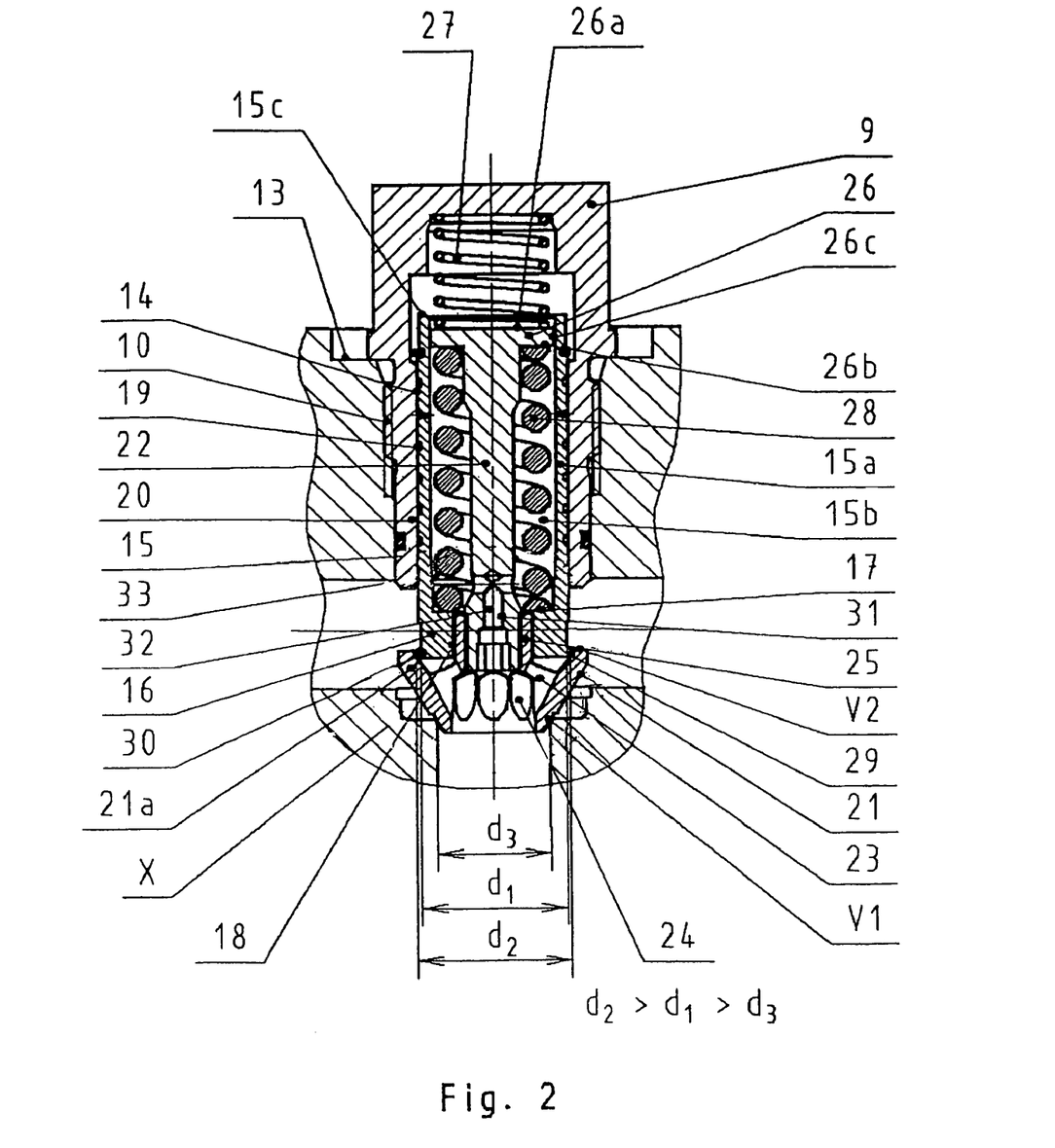
FIG. 2 shows details of FIG. 1 on an enlarged scale.

The definitive diameters are emphasized in the enlarged illustration according to FIG. 2. In this case, $d_1$ is the diameter which the tubular guide piston has over most of its length. The outside diameter of the collar 30, which is situated on the end wall 16 of the tubular guide piston 15, is designated by $d_2$. The inside diameter of the first flow duct 2 in the region of the first valve seat 4 is designated by $d_3$. Definitive flow cross sections $F_1$, $F_2$ and $F_3$ correspond to the diameters $d_1$, $d_2$ and $d_3$, as will be explained in greater detail below.

The collar 30 forms, together with the second valve seat 29, the second valve V2.

In that end region which is connected to the hollow guide stem 25, the extension stem 22 is open on the end side and is provided with a flow passage 31. The latter is composed of a longitudinal bore 32 and a transverse bore 33. As a result, a flow connection for the hydraulic fluid between the first flow duct 2 and the annular cylindrical interior space 15b in the tubular guide piston 15 is produced via the ribbed structure 23 of the valve cone 21.

Between the circular cylindrical circumferential surface 26c of the pressure and guide plate 26 and the inside diameter of the tubular guide piston 15 there is play of sufficient size, so that a flow connection is provided between the annular cylindrical interior space 15b and the interior space of the tubular partial housing 9, in which the first compression spring 27 is situated. As an alternative, the longitudinal bore 32 in the extension stem 22 may also be continued into the outer surface 26a of the pressure and guide plate 26. A decisive factor is the bringing about of a continuous interior space comprising the interior spaces of the valve cone, the tubular guide piston 15 and the tubular partial housing 9. This continuous interior space is continuously connected to the first guide duct 2 but, when the valves V1 and V2 are closed, is adequately sealed off from the second flow duct 5. The sealing takes place by means of the annular grooves 19 (already mentioned) between the region 15a of the tubular guide piston 15 and the inner wall of the accommodating space 14 in the tubular partial housing 9.

In addition, the play between the circular cylindrical circumferential surface 26c of the pressure and guide plate 26 and the inside diameter of the tubular guide piston 15 is decisive for the damping of the valve. If the flow connection between the interior of the valve cone 21 and the accommodating space 14 of the tubular partial housing 9 is produced via a continuous duct in the extension stem 22, then the play which is mentioned can be focused solely on the damping requirements.

The manner of operation of the valve arrangement illustrated in FIGS. 1 to 4 is described below.

The state according to FIGS. 1 and 2 arises when the difference in pressure of the hydraulic fluid in the two flow ducts 2 and 5 does not exceed a threshold value. The threshold value of the first valve V1 is determined by the first compression spring 27 and the threshold value of the second valve V2 is determined by the second compression spring 28. The two compression springs 27 and 28 then have the effect of the two valves V1 and V2 remaining closed.

Figure 3:
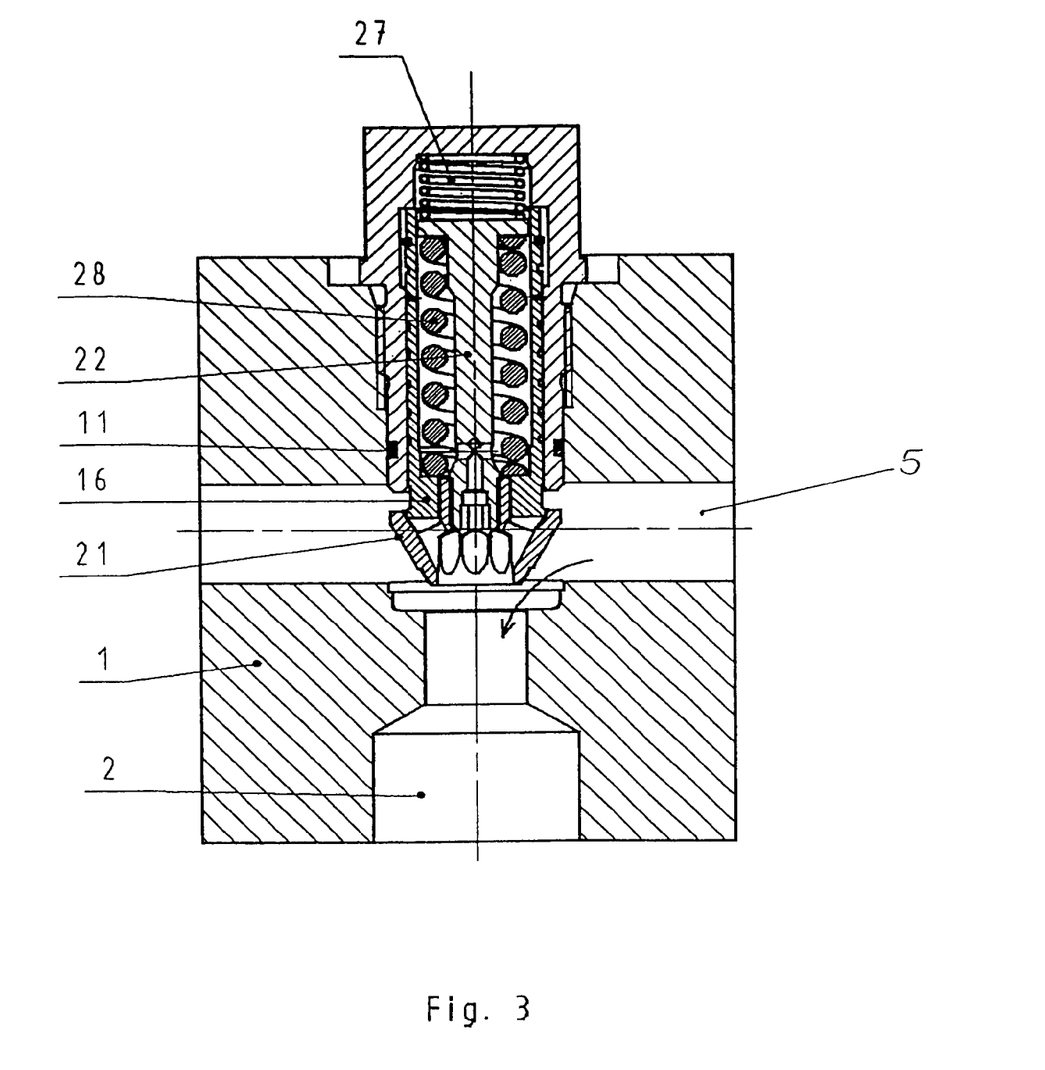
FIG. 3 is an illustration corresponding to FIG. 1, and shows the feed-in function, but in which the first valve V1 is open.
Figure 4:
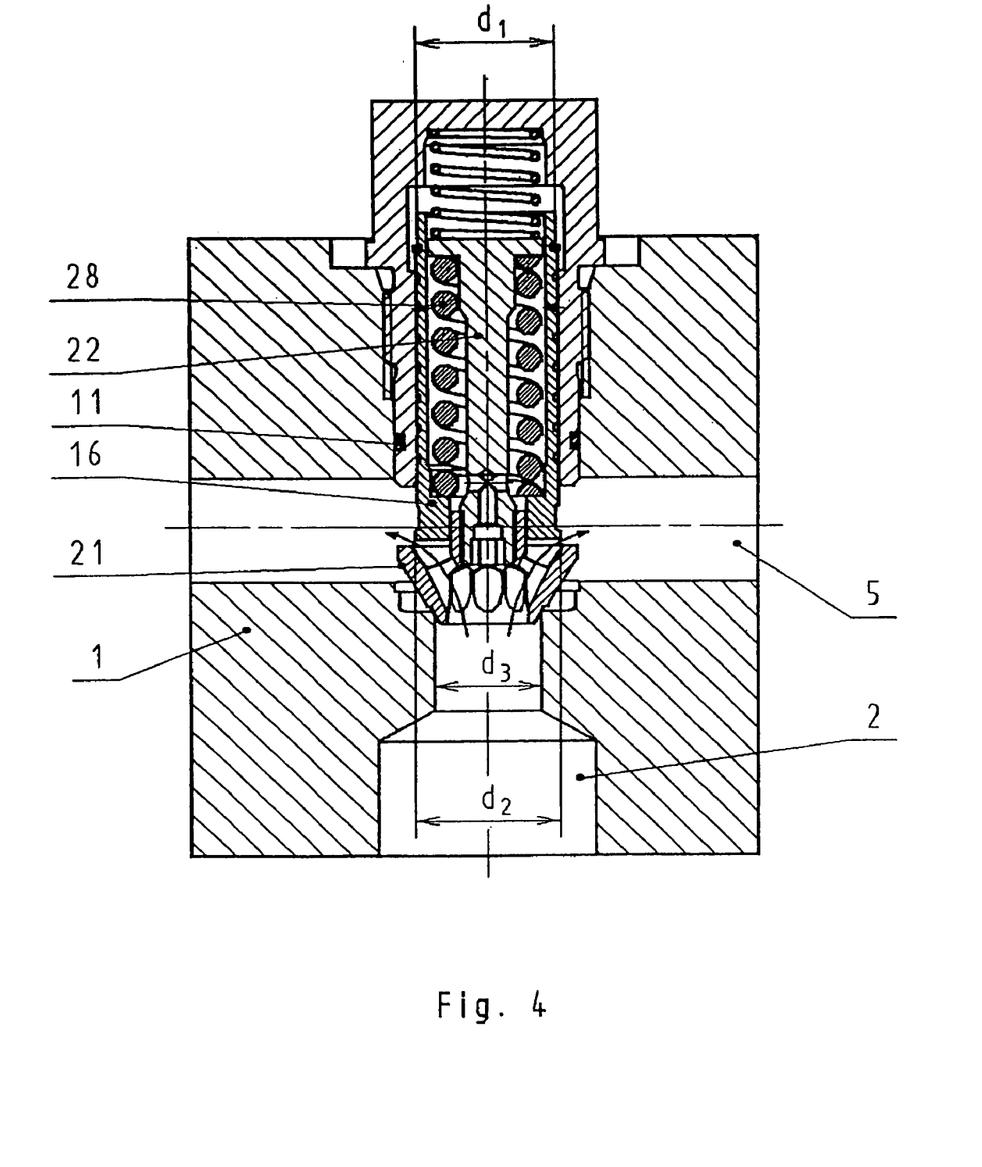
FIG. 4 constitutes the illustration corresponding to FIG. 2 during opening of the second valve V2, and shows the high-pressure function.

$P_2$ designates the pressure in the first flow duct 2 and $P_5$ designates the pressure in the second flow duct. In the event of $P_5$ being greater than $P_2$ and the difference in pressure exceeding the threshold value, an actuating force $(P_5-P_2)$ $(F_1-F_3)$ arises. This is because the pressure acting externally on the unit comprising the valve cone 21 and tubular piston 15 is eliminated as far as the diameter $d_1$ in both directions of actuation, while in the cross-sectional region $d_2$ to $d_1$ the lower pressure $P_2$ prevailing on the inside opposes the higher pressure $P_5$ prevailing on the outside. This difference in pressure has the effect of lifting off the valve cone 21, and therefore also the tubular piston 15, from the first valve seat 4, with the first valve spring 27 being compressed. The first valve V1 therefore opens. This state is illustrated in FIG. 3. The hydraulic fluid which is under the higher pressure Ps then flows out of the second flow duct 5 into the first flow duct 2 until the pressure is equalized, the threshold value is dropped below and the valve V1 closes again.

By contrast, if $P_2$ is greater than $P_5$ and the threshold value is exceeded, then the valve cone 21 is held against the first valve seat 4 because the pressure $P_2$ acting in the direction of the valve seat 4 acts on the larger surface and the pressure $P_2$ acting in the opposite direction can act only on the surface. By contrast, the actuating force $(P_2-P_5)$ $(F_2-F_1)$ comes about on the collar 30 of the tubular guide piston 15. This is because the compressive forces (at the top and bottom in the drawing) acting on the two end surfaces of the tubular guide piston 15 are compensated for up to the diameter $d_1$, but in the region of the collar 30, i.e. between $d_1$ and $d_2$, the lower pressure $P_5$ on the outside opposes the greater pressure $P_2$ on the inside. In consequence, the tubular guide piston 15 lifts off from the second valve seat 29, and the second valve V2 opens, cf. FIG. 4. In this case, hydraulic fluid flows out of the first flow duct 2 into the second flow duct 5 until the pressure is equalized, the threshold value is dropped below and the second valve V2 is closed again.

Figure 5:
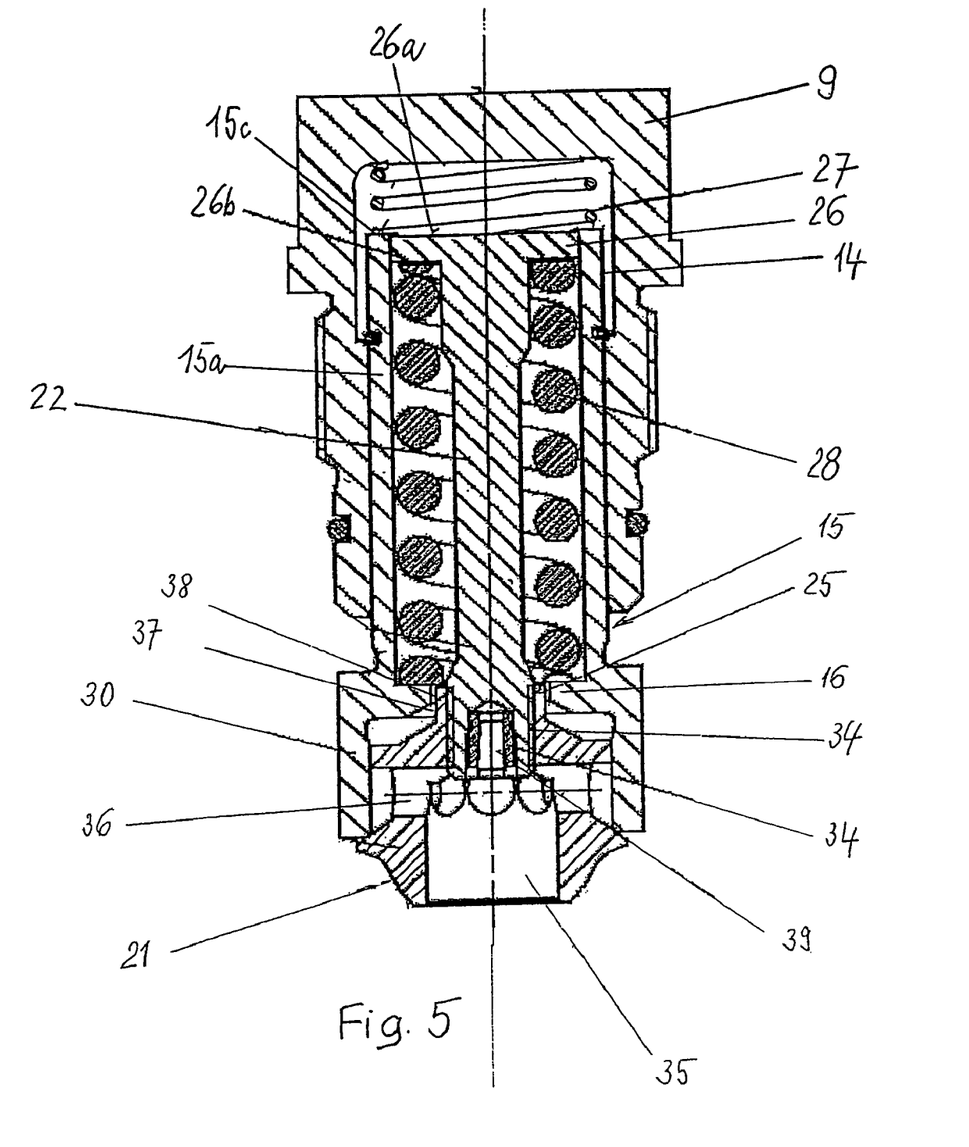
FIG. 5 shows structural modifications of details of the valve arrangement according to the invention.

FIG. 5 is an illustration of the partial housing 9 with the tubular guide piston 15 and the valve cone 21, with some details having been modified in comparison with the first exemplary embodiment. The parts are basically the same as in the first exemplary embodiment, and so the reference numbers which have already been introduced have been able to remain unchanged for this too.

The support of the first compression spring 27 has been changed. According to FIG. 5, the first compression spring 27 is no longer supported on the outer surface 26*a* of the pressure and guide plate 26 which is situated on the extension stem 22. On the contrary, the first compression spring 27 acts on the end surface 15*c* of the cylindrical region 15*a* of the tubular guide piston 15. There are therefore no changes to the entire characteristics of the valve arrangement according to the invention because the valve cone 21 and the tubular guide piston 15 are in any case pressed against each other by the second compression spring 28 which has to be considerably stronger than the first compression spring 27.

Furthermore, in the case of the exemplary embodiment according to FIG. 5, a flow passage having a longitudinal bore and transverse bore in the extension stem 22 has been omitted.

According to FIG. 5, the collar 30 on the end wall 16 of the tubular guide piston 15 is pulled a good distance downwards and therefore forms a guide sleeve for the valve cone 21 which is largely situated in the interior of the sleeve-shaped collar 30. In this variant, the collar 30 engages over the sealing surface on the valve cone 21. That region of the valve cone 21 which is at the bottom in FIG. 5, as before, forms, together with a valve seat, which is formed on the stationary part, the first valve. The hydraulic fluid which is situated in the first flow duct enters via the end-side opening 35 into the valve cone 21 and passes via a transverse bore 36, formed in the valve cone 21, and via the radial play between the valve cone and the interior space of the collar 30 into an annular space which is formed in the transition from the valve cone 21 to the hollow guide stem 25. The hydraulic fluid then passes via an inlet cone 37 in the end wall 16 of the tubular guide piston 15 and via an adequately dimensioned radial play 38 between the hollow guide stem 25 and the end wall 16 into the inner annular space between the cylindrical region 15*a* of the tubular guide piston and the extension stem 22. The connection between the extension stem 22 and the valve cone 21 also takes place here by a fastening thread 34 which has been supplemented by a centering pin 39.

A decisive factor here is also that a connection from the first flow duct to the accommodating space 14 for the tubular guide piston 15 is always ensured.

What is claimed is:

1. A valve arrangement for controlling hydraulic fluid in an axial piston machine, in which a first flow duct (2) is provided in a stationary part (1) and opens out into a second flow duct (5) running transversely with respect to it, comprising:

an accommodating space (14) of the stationary part (1) lying opposite the second flow duct (5) in the extension of the first flow duct (2) for accommodating and guiding a multiple valve body (20), which is displaced in the direction of the central axis (3) of the first flow duct (2);

the multiple valve body having a first and a second valve body which are arranged one behind the other in the direction of the longitudinal axis of the first flow duct (2) and are displaced in relation to each other in this direction;

the first valve body facing the first flow duct (2) engaging with a first valve seat (4) formed in the region in which the first flow duct (2) opens out into the second flow duct (5) to form a first valve (V1);

the second valve body engaging with a second valve seat (29) formed in the first valve body and situated in the region of the second flow duct (5) to form a second valve (V2), the hydraulic cross section $F_2$ of the second valve seat (29) being larger than the hydraulic cross section $F_3$ of the first valve seat (4) and the two valve bodies being prestressed against their valve seats (4, 29) by first and second compression springs (27, 28);

the accommodating space (14) of the stationary part (1) being connected to the first flow duct (2) via the two valve bodies and sealed from the second flow duct (5); and the hydraulically effective cross sections $F_2$ and $F_3$ of the first and second valve seat (4, 29) having dimensioned and the two compression springs (27, 28) being coordinated such that the first valve (V1) opens when the hydraulic fluid in the second flow duct (5) has a pressure $P_5$ which is larger than the pressure $P_2$ in the first flow duct (2) and the threshold value is exceeded, or the second valve (V2) opens when the hydraulic fluid in the first flow duct (2) has a pressure $P_2$ which is greater than the pressure $P_5$ in the second flow duct (5) and a threshold value is exceeded, while in the inoperative position the two valves (V1, V2) are closed.

2. The device of claim 1 wherein the first flow duct (2) serves as a connecting line to a high-pressure working line and the second flow duct (5) serves as a connecting line to a source for hydraulic fluid that is under high pressure, the first valve (V1) being operated as a high-pressure feed valve and the second valve (V2) being operated as a pressure-limiting valve.

3. The device of claim 1 wherein the first valve body is a valve cone (21) with an extension stem (22) positioned at its end opposite the first valve seat (4); the second valve body having the shape of a tubular guide piston (15) guided in a longitudinally displaceable manner in the accommodating space (14) of the stationary part (1) for accommodating and guiding the first valve body; the first compression spring (27) being supported on the stationary part (1) and prestressing the multiple valve body against the first valve seat (4); the second valve spring (28) positioned between the tubular guide piston (15) and the valve cone (21) and prestressing the guide piston (15) against the second valve seat (29).

4. The device of claim 3 wherein an end wall (16) of the tubular guide piston (15)1 interacts with the second valve seat (29) and has an outer collar (30), the outside diameter $d_2$ of which is enlarged in comparison with the outside diameter $d_1$, of the remaining region (15a) of the tubular guide piston (15) and, in the closed state of the second valve (V2), bears against the second valve seat (29).

5. The device of claim 4 wherein the outside diameter $d_2$ of the collar (30), the outside diameter $d_1$ of the remaining region (15a) of the tubular guide piston (15), and the hydraulically effective diameter $d_3$ of the first valve (V1) determine the hydraulically effective cross sections $F_1$, $F_2$ and $F_3$ of the valve arrangement, which are graduated in accordance with the relationship $F_2 > F_1 > F_3$.

6. The device of claim 5 wherein a guide stem (25) is positioned at the end of the valve cone (21) facing away from the first valve seat (4), said guide stem being guided in a slideable manner in a bore (18) in the end wall (16) of the tubular piston (15).

7. The device of claim 6 wherein the extension stem (22) is screwed into the guide stem (25) which is hollow and has an internal thread.

8. The device of claim 7 wherein the tubular guide piston (15) surrounds the extension stem (22) at a distance, and the second compression spring (28), which is supported under prestress on stop and active surfaces of the guide piston (15) and of the extension stem (22), is arranged in the annular cylindrical interior space (15b) between the guide piston (15) and the extension stem (22).

9. The device of claim 8 wherein a pressure and guide plate (26) is secured to the end of the extension stem (22) facing away from the valve cone (21), the pressure and guide plate (26), on its inner annular surface (26b) facing the valve cone, serving as a stop and active surface for the second compression spring (28) and, on its circular cylindrical circumferential surface (26c), being guided in a slideable manner in the tubular guide piston (15).

10. The device of claim 9 wherein the pressure and guide plate (26) is acted upon its outer surface (26a) facing away from the valve cone (21) by the first compression spring (27).

11. The device of claim 9 wherein the first compression spring (27), which is supported in a stationary manner, acts upon the tubular guide piston (15) on its end surface (15c) which faces outwards and faces away from the valve seats (4, 29).

12. The device of claim 11 wherein a tubular partial housing (9), which is inserted from the outside in a pressure tight manner into the stationary part (1), is designed in its interior as an accommodating space (14) and guide of the tubular guide piston (15) and serves to support the first compression spring (27) on the stationary part (1).

13. The device of claim 12 wherein the valve cone (21) is connected in the form of an annular casing (21a) via a ribbed structure (23) to the hollow guide stem (25).

14. The device of claim 13 wherein the end of the extension stem (22) which is inserted into the hollow guide stem (25) is open on the end side and is connected via a flow passage (31), which is formed in its interior, to the annular cylindrical interior space (15b) of the tubular guide piston (5), as a result of which the connection to the first flow duct (2) is also formed via the ribbed structure (23) of the valve cone (21).

* * * * *